United States Patent [19]

Dixon

[11] Patent Number: 4,705,240

[45] Date of Patent: Nov. 10, 1987

[54] PASSIVE VORTEX LIFT CONTROL

[76] Inventor: Charles J. Dixon, 3261 Hickory Crest Dr., Marietta, Ga. 30064

[21] Appl. No.: 610,094

[22] Filed: May 14, 1984

[51] Int. Cl.$^4$ ............................................. B64C 23/06
[52] U.S. Cl. ..................................... 244/199; 244/207
[58] Field of Search ............... 244/198, 199, 200, 201, 244/35 R, 207

[56] References Cited

U.S. PATENT DOCUMENTS

| | | | |
|---|---|---|---|
| 2,417,189 | 3/1947 | Cornelius | 244/35 R |
| 2,628,043 | 2/1953 | Montgomery | 244/35 R |
| 2,769,602 | 11/1956 | Furlong | 244/199 |
| 3,480,234 | 11/1969 | Cornish, III | 244/199 |
| 4,387,869 | 6/1983 | Englar et al. | 244/207 |

OTHER PUBLICATIONS

*Flight International*, "Forward-Swept-Wing Technology", by Graham Warwick, 22 May 1982, pp. 1317-1319.

*Primary Examiner*—Trygve M. Blix
*Assistant Examiner*—Rodney Corl

[57] ABSTRACT

A method of applying and controlling vortex lift to a unique high-lift airfoil (29) is described wherein the planform of the airfoil (29) comprises a swept-forward outer panel (31) and a swept-aft or unswept inboard panel (33). A leading edge vortex (37) is formed on (31) and attached flow is maintained on (33). The attached flow on (33) causes the vortex (37) of the airfoil (29) to turn downstream and also induces axial flow along axis of vortex (37). Both of these results serve to delay vortex burst. A high-lift trailing edge device (45) such as a mechanical flap as the circulation control concept will induce a high leading edge flow angularity and cause the vortex (37) to grow in strength, thereby increasing vortex lift. The vortex (37) replaces the high-weight, high-lift leading device that would otherwise be required.

15 Claims, 6 Drawing Figures

$C_L$ = Local Left Coefficient
$C_\eta$ = Local Airfoil Chord
$\bar{C}_\eta$ = Average Wing Chord ---- Conventional Airfoil
——— Swept Forward Airfoil

PASSIVE VORTEX LIFT CONTROL

TECHNICAL FIELD

The present invention generally relates to a method and apparatus for facilitating vortex lift and more particularly to a method and apparatus for establishing vortex lift along the span of the planform of a unique, high-lift airfoil which can be employed as a wing, side force generator or control surface.

BACKGROUND ART

The term airfoil, as used hereinafter, designates any body whose shape causes it to receive a useful reaction from an air stream moving relative to it. The term is usually associated with the profile or chordwise section of the wing. Such aircraft components as wings, movable control members, and stabilizers, by way of example only, are deemed to be airfoils as the term is used herein. Planform, as used hereinafter, refers to the contour of an aerodynamic surface, such as, for example, a wing, control surface or stabilizer, as viewed perpendicular to the plane of the surface. Lifting surface, as used hereinafter, refers to such aircraft components as, for example, wings, control surfaces, canards and side force generators.

Aircraft capable of extended range while cruising a supersonic Mach number typically employ highly-swept, slender wings. These delta-wings are of interest because they have the potential to obtain relatively low drag at supersonic lifting conditions. However, a familiar characteristic of these wings is the sudden formation of rather stable leading-edge vortices at off-design conditions. These leading-edge vortices have a profound influence on the wing pressure distribution and, therefore, on the aerodynamic performance, stability characteristics, and the structural design loads.

The formation of the leading-edge vorticity results because the boundary layer on the lower surface of the wing flow outward and separates as it goes over the leading edge, forming a free shear layer. The shear layer curves upward and outboard, eventually rolling up into a core of high vorticity. There is an appreciable axial component of motion and the fluid spirals around and along the axis. A spanwise outflow is induced on the upper surface, beneath the coiled vortex sheet, and the flow separates again as it approaches the leading edge, forming secondary vortex.

The size and the strength of the coiled vortex sheets increase with increasing incidence and they become a dominant feature of the flow, which remains steady throughout the range of practical flight attitudes of the wing. The formation of these vortices is responsible for the nonlinear aerodynamic characteristics that exist over a given angle-of-attack range which give rise to vortex lift.

Essentially, vortex lift control involves stabilizing the vortex shed from the leading edge of the wing so as to lock the leading edge vorticity along the spanwise direction of the wing. This causes lift-producing, streamline airflow to pass over the upper surface of the wing, over the locked vortex, and then to become reattached to the wing surface. This results in an effective increase of the wing camber and thus increased lift.

It is known that vortex stability is highly dependent on the velocity of axial flow external to the vortex core as well as the vortex swirl velocity. In the past, either sweep, such as found with a highly swept delta-wing, or some other mechanism for inducing axial flow, has been employed to organize and stabilize the leading edge vortex so as to delay the bursting thereof.

Thus, passive vortex lift control is a means to control, without adding energy, vortex burst, i.e. the point at which the vortex becomes unstable due to reaching certain critical limits of its characteristics. At the location of vortex burst, the wing lift is severely reduced. Therefore, means of controlling the vortex stability is required to delay vortex burst and increase the wing lift.

One prior art passive vortex lift control method, for inducing the necessary axial flow required to organize the separated air flow from the leading edge of the airfoil into a vortex, is the leading edge extention or strake. Typically, the strake is positioned inboard of and upstream to the airfoil and is provided with a leading edge having sufficient sharpness such that air flow separation is fixed at the leading edge thereof. The strake thus forms a stable strake vortex at a given angle of attack which induces spanwise flow from the inboard portion of the wing towards the wing tip. This axial flow, as noted above, serves to organize the air flow separation at the leading edge of the wing into a vortex.

Because almost all present day, high performance wings have some degree of aft sweep, the above-noted passive method for inducing axial flow is operationaly quite efficient. However, the modern trend in high performance aircraft is to utilize a swept forward wing configuration for which strake induced axial flow is inapplicable.

DISCLOSURE OF THE INVENTION

It is, therefore, one object of the present invention to provide a method and apparatus for applying and passively controlling vortex lift to a unique, high-lift airfoil having a swept forward configuration.

Another object of the present invention is to provide a method and apparatus for preventing or postponing the occurrence of lift-diminishing vortex burst from an airfoil surface having a swept-forward configuration.

Yet another object of the present invention is to delay vortex bursting and improve lift to drag ratios at moderate to high angles of attack.

A further object of the present invention is to provide a method and apparatus for inducing axial flow along the span of a swept forward airfoil, such axial flow moving from the outboard portion of the airfoil towards the inboard portion of the airfoil.

Still another object of the present invention is to provide a method and apparatus for delaying vortex bursting by decreasing the swirl velocity of the leading edge airfoil vortex employed in vortex lift by controlling the spanwise distribution of the leading edge thrust.

A further object of the present invention is to increase vortex strength as a result of the high leading edge flow angle induced by a trailing edge, high-lift device.

The principal feature of the present invention is the provision of a totally new approach to establishing and controlling vortex lift on a unique, high-lift airfoil having a swept forward outer panel and a swept aft or unswept inboard panel. In accordance with the instant invention, one important aspect of the present method and apparatus is the technique of inducing leading edge air flow separation on the outboard panel over a given angle of attack range and maintaining attached air flow on the inboard panel over the given range. The attached flow on the inboard panel creates a pressure sink which passively induces axial flow along the span of the planform of the airfoil moving inboard. This axial flow serves to organize and stabilize the leading edge air flow separation into a vortex. Additionally, the attached flow on the inboard panel causes the vortex to turn downstream adjacent the intersection of the inboard and outboard panels. Both these results, i.e., downstream funnelling of the vortex and the axial flow, serve to delay vortex burst and provide a structurally favorable pressure distribution along the span of the airfoil.

Another unique aspect of the present method and apparatus is the technique of varying the leading edge radius of the airfoil of the outer panel and the airfoil thickness along the span of the planform of the outer panel. It has been found that for a given leading edge radius and airfoil thickness there is a given leading edge thrust which is recovered as vortex lift. Because the swirl velocity of the leading edge vortex is a function of leading edge thrust, it is possible to design the airfoil of the outerpanel so as to produce a recovered leading edge thrust distribution, along the span of the planform of the outer panel, which provides a vortex having a swirl velocity much lower than that required to burst the vortex.

An important feature and a significant advantage of the present invention is the ability to control the effective angle of attack of the unique airfoil and thus the leading edge thrust recovery so as to provide a desired amount of vortex lift without altering the actual angle of attack of the airfoil. A high-lift, trailing edge device, such as a mechanical flap or control circulation, will induce a high leading edge flow angularity which results in a growth of vortex strength to thereby increase vortex lift.

Another important feature of the present invention is that a favorable vortex lift pressure distribution, along the span of the planform of the outer panel, is possible which provides an increasing gradient of available vortex lift moving from the tip of the airfoil towards the inboard portion thereof.

Yet another important feature of the present invention is that the entrained flow is passive and does not require the use of active concepts such as spanwise blowing or suction.

One advantage of the present invention is that the vortex of the outer panel replaces the high-weight, high-lift leading edge device that would otherwise be required. Only the inboard panel requires a leading edge, high-lift device or stall depressor.

Briefly, other advantages of the present invention include lower pitching moments than swept aft, high-lift wings as well as a wing configuration that is virtually spin proof with positive roll control throughout stall. Additionally, the swept forward airfoil configuration has natural vortex burst control, delaying stall to angles higher than mechanical leading edge devices. Furthermore, the airfoil of the present invention can be designed to provide high lift at low speeds without compromise to cruise.

These and other objects, features, and advantages of the present invention will be more apparent as the following description proceeds with particular reterence to the application drawings.

BEST MODE FOR CARRYING OUT THE INVENTION

Figure 1:
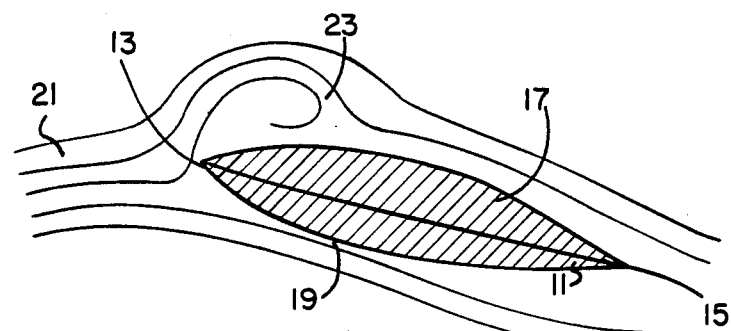
FIG. 1 illustrates the formation of a leading edge vortex employed to facilitate vortex lift.

FIG. 1 illustrates a conventional swept aft airfoil 11 having a leading edge 13, a trailing edge 15, an upper surface 17 and an under surface 19. As shown, the airfoil 11 is at a positive angle of attack with respect to the oncoming air 21.

Utilizing vortex lift principles, it is possible to design the airfoil 11 to have leading edge separation. The separated flow is organized on the upper surface 17 into a leading edge vortex 23 which is positioned adjacent to the leading edge 13 as shown in FIG. 1. Typically, this organized vortex 23 extends along the span of the upper surface 17 and remains substantially locked in position relative to the surface 17. The locked vortex 23 rotates in a direction which causes the main chordwise air flow over the airfoil 11 to flow above the locked vortex 23 and then to be deflected downward so as to become reattached to the surface 17 aft of the vortex 23.

Figure 2:
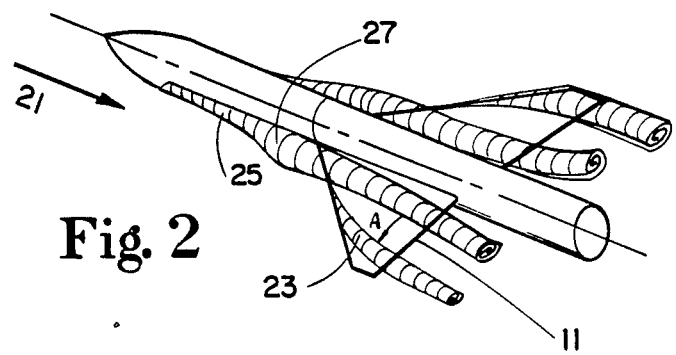
FIG. 2 illustrates a conventional swept aft airfoil having a strake for organizing and stabilizing leading edge flow separation.

To organize the separate flow into the vortex 23, the airfoil 11 is typically provided with a leading edge extension or strake 25 as shown in FIG. 2. The purpose of the strake is to form a stable vortex 27 at a given angle of attack. The strake vortex 27 serves to organize the vortices shed from the leading edge 13 into the vortex 23 which is stabilized by the spanwise flow A resulting from the strake vortex 27. Conversion of the separated flow energy to an organized vortex 23 results in an increase in lift as the angle of attack increases until reaching a point at which the vortex 23 bursts and lift is reduced.

The leading edge vortex 23 is much stronger than the strake vortex 27, however, it is important to note that the strake vortex 27 serves to stabilize and control the leading edge vortex 23. In fact, without some sort of axial flow external to the core of the leading edge vortex 23, this vortex 23 would not exist or would, at best, be very weak.

However, with a swept forward airfoil, it is not possible to employ a strake to provide the requisite axial flow external to the core of the vortex need for stabilization. While it may be possible to employ an active means of inducing axial flow, such as, for example, spanwise blowing or suction, the present invention proposes a passive means for inducing axial flow as will be apparent as the following description proceeds.

Figure 3:
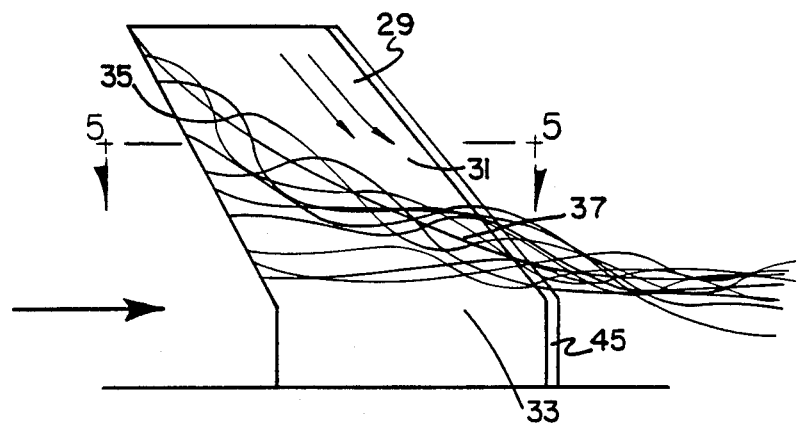
FIG. 3 illustrates the unique, high-lift airfoil of the present invention.

Referring to FIG. 3, a swept-forward airfoil 29, having a planform as illustrated, is shown. The airfoil 29 comprises a swept-forward outer panel 31 and a swept aft or unswept inboard panel 33. Outer panel 31 is provided with a sharp or small leading edge 35 to insure leading edge vortex formation. In contrast, the inboard panel 33 has an airfoil designed to delay separation as much as possible. The purpose of the attached flow on the inboard panel 33 is to maintain the low pressure associated with the sustained lift. The low pressure on the inboard panel 33, created by the attached flow, causes a pressure sink which results in an axial flow velocity external to the core of the vortex 37 of the swept-forward outer panel 31. This axial flow moves from the tip of the airfoil 29 inboard towards panel 33. Additionally, the attached flow causes the vortex 37 to turn downstream at the intersection of the inboard and outboard panels. Both of these results serve to delay vortex burst.

Figure 4:
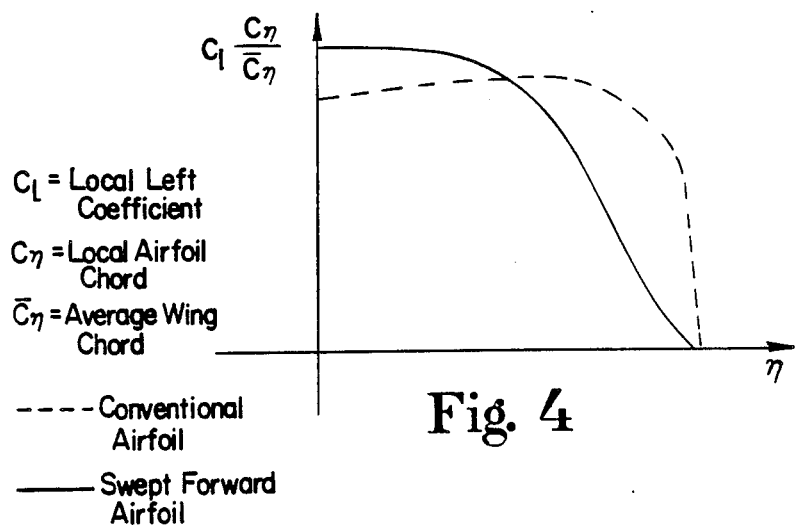
FIG. 4 graphically compares the spanwise load distribution for the airfoil of the present invention and a conventional aft swept, vortex lift airfoil.

Additionally, the airfoil 29, illustrated by FIG. 3, provides a structurally favorable wing loading distribution when compared with a conventional swept-aft wing as shown in FIG. 4. As the vorticity shed from the leading edge 35 rolls up into a vortex above the surface of the outer panel 31, the vortex produces an additional inboard load on the airfoil 29. The important difference between the loading distribution for the airfoil 29 of the present invention and that of a conventional airfoil having vortex lift is that the loading distribution for airfoil 29 increases from tip to root whereas the load distribution for a swept-aft wing increased from root to tip. Thus, the loading distribution for the airfoil 29 produces a lower airfoil bending moment than that of the swept-aft wing and therefore provides more favorable structural design loading.

In accordance with another embodiment of the present invention, the outboard panel 31 may have a sharp leading edge 35 at the tip with an increase in leading edge radius when moving towards inboard panel 33. This variation in leading edge radius produces a recovered leading edge thrust distribution, along the span of the planform of the outer panel 31, so as to provide a vortex having a swirl velocity much lower than required to burst the vortex as disclosed in applicant's pending application entitled, "Method and Apparatus for Controlling Vortex Lift", which is hereby incorporated, in its entirety, by reference.

It has been found in tests that this combination of forward sweep and varying leading edge radius delays the leading edge vortex burst to relatively high angles of attack. In fact, a swept forward airfoil in accordance with the invention, having a forward sweep of 35°, delays stall to as high an angle of attack as a 75° swept aft wing. The major advantages of this concept are: (1) no high-lift, high-weight leading edge device is required when a high lift trailing edge device is used, and (2) airfoils can be designed for cruise as long as flow separation occurs at the leading edge first.

Figure 5:
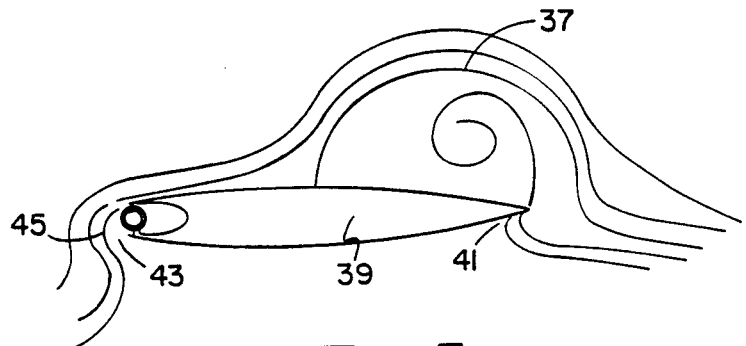
FIG. 5 is a sectional view taken along line 5—5 of FIG. 3 illustrating the air flow over the unique, high lift airfoil of the present invention.

Because vortex lift is a function of the angle of attack of the airfoil, it is possible to increase vortex strength as a result of a high leading edge flow angle induced by a high lift trailing edge device such as a circulation control wing (CCW) 39 having a leading edge 41 and a trailing edge 43 as shown in FIG. 5. Essentially, the CCW wing includes an air blown flap 45, however, a mechanical flap would suffice.

Figure 6:
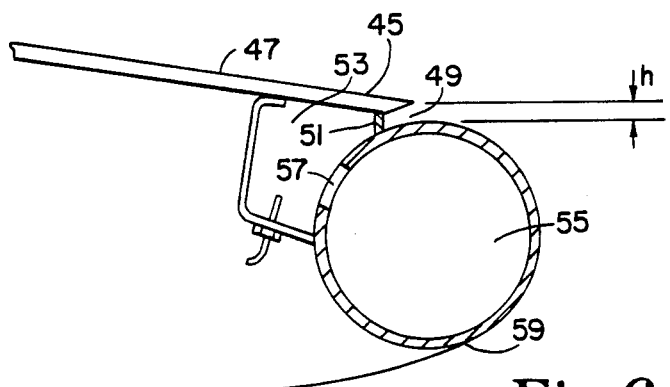
FIG. 6 shows the trailing edge of the airfoil of the present invention in combination with circulation control.

The air blown flap 45, as shown in FIG. 6, comprises a hinged plenum top plate 47 for adjusting the width h of slot 49 via slot adjustment screw 51. A CCW plenum 53 connects to an air supply 55 via holes 57 formed through a CCW trailing edge pipe 59, the air supply being fed from the pipe ends of pipe 59. The fluid discharged from the interior of pipe 59 is ejected tangentially to the air stream as illustrated in FIG. 5 so that the boundary layer stays attached to the trailing edge 43 as shown.

Because the flap 45 imparts a downward velocity to air flow downstream of the trailing edge 43, a high leading edge flow angle is induced. Thus, by controlling the angle of downward flow from flap 45, is it possible to control the angle of flow at the leading edge 41. Since the amount of vortex lift developed is dependent on the angle of attack, i.e. the angle of flow at the leading edge, it is possible to control the amount of vortex lift developed without actually altering the actual angle of attack of the wing 39.

While the present invention has been described with particular reference to preferred embodiments, it is understood by those of ordinary skill in the art that certain changes in form and detail maybe made therein without departing from the spirit and scope of the invention as defined in the appended claims.

I claim:

1. A high-lift lifting surface for establishing and controlling vortex lift, said lifting surface comprising:
    (a) an outboard panel having a leading edge that is swept forward, said panel being adapted to induce edge air flow separation at angles of attack prior to stall while maintaining attached trailing edge flow;
    (b) an inboard panel adapted to maintain attached air flow; whereby the attached flow on said inboard panel creates a pressure sink for passively inducing axial air flow along the span of the outboard panel moving inboard, such axial flow serving to organize and stabilize the leading edge air flow separation into a leading edge vortex.

2. A lifting surface according to claim 1, wherein said outboard panel further comprises:
    a high-lift, trailing edge device for varying the effective angle of attack of said lifting surface.

3. A lifting surface according to claim 2, wherein said high-lift, trailing edge device comprises a flap.

4. A lifting surface according to claim 2, wherein said high-lift, trailing edge device comprises:
    (a) a fluid discharge conduct for discharging a fluid from the trailing edge of said lifting surface substantially tangentially to the trailing edge of said lifting surtace so that the boundary layer stays attached to the trailing edge; and
    (b) fluid control surface for imparting a substantially downward velocity to the air flow downstream of the trailing edge of said lifting surface.

5. A lifting surface according to claim 4, wherein said high-lift, trailing edge device discharges fluid only from the trailing edge of said outboard panel.

6. A lifting surface according to claim 5, wherein said inboard panel is substantially without sweep.

7. A lifting surface according to claim 6, wherein said inboard panel is swept aft.

8. A high-lift, lifting surface for establishing and controlling vortex lift, said lifting surface comprising:
    (a) an outboard panel having a leading edge that is swept forward, said panel being adapted to induce leading edge air flow separation over a given angle of attack range prior to stall while maintaining attached trailing edge flow; and
    (b) an inboard panel adapted to maintain attached air flow over said given range to create a pressure sink which passively induces axial air flow along the span of said outboard panel moving inboard, such axial air flow serving to organize and stabilize the leading edge air fow separation into a leading edge vortex;

(c) a leading edge having a small but finite leading edge radius which is carried along the span of said outboard panel; and (d) a given airfoil thickness of said outboard panel which is related to said leading edge radius for a given spanwise location of said outboard panel to form a favorable, recovered leading edge thrust distribution to provide the leading edge vortex having a swirl velocity lower than that required to burst the vortex over said given angle of attack range.

9. A method of establishing and controlling vortex lift on a lifting surface having at least an outboard panel having a leading edge with forward sweep, and an inboard panel, said method comprising the steps of:

(a) inducing leading edge air flow separation on the outboard panel at angles of attack prior to stall while maintaining attached trailing edge flow; and (b) maintaining attached air flow on the inboard panel; whereby the attached flow on the inboard panel creates a pressure sink which passively induces axial flow along the span of the outboard panel moving inboard, such axial flow serving to organize and stabilize the leading edge air flow separation into a leading edge vortex.

10. A method according to claim 9, further comprising the step of:

varying the effective angle of attack of the leading edge of the lifting surface utilizing a high-lift, trailing edge device.

11. A method according to claim 10, wherein the step of varying the effective angle of attack further comprises the steps of:

(a) discharging a fluid from the trailing edge of the airfoil substantially tangentially to the trailing edge surface so that the boundary layer stays attached to the trailing edge; and (b) imparting a downward velocity to the air flow downstream of the trailing edge of the airfoil.

12. A method according to claim 11, wherein the step of discharging the fluid further comprises the step of: discharging the fluid from only the trailing edge of the outboard panel.

13. A method according to claim 12, wherein the inboard panel is substantially unswept.

14. A method according to claim 12, wherein the inboard panel is swept aft.

15. A method for establishing and controlling vortex lift on an airfoil having a planform including at least an outboard panel having a leading edge with forward sweep and an inboard panel, said method comprising the steps of:

(a) inducing leading edge air flow separation on the outboard panel over a given angle of attack range prior to stall while maintaining attached trailing edge flow;

(b) maintaining attached air flow on the inboard panel over the given range to create a pressure sink which passively induces axial air flow along the span of the planform of the outboard panel moving inboard, such axial air flow serving to organize and stabilize the leading edge air flow separation into a leading edge vortex; and (c) varying the leading edge radius and airfoil thickness along the span of the planform of the outboard panel to provide a favorable, recovered leading edge thrust distribution which controls the growth of the leading edge vortex during air flow separation to delay vortex bursting by providing the vortex with a swirl velocity lower than that required to burst the vortex.

* * * * *